United States Patent [19]

Ohashi et al.

[11] Patent Number: 4,866,550

[45] Date of Patent: Sep. 12, 1989

[54] MAGNETIC RECORDING AND REPRODUCING APPARATUS WITH SELECTIVE LOADING OF DIFFERENT SIZED MAGNETIC TAPES

[75] Inventors: Keiichi Ohashi, Utsunomiya; Hiroshi Umehara; Hajime Nagahashi, both of Yaita, all of Japan

[73] Assignee: Sharp Kabushiki Kaisha, Osaka, Japan

[21] Appl. No.: 171,746

[22] Filed: Mar. 22, 1988

[30] Foreign Application Priority Data

Aug. 7, 1987 [JP] Japan .................. 62-198415

[51] Int. Cl.[4] ............... G11B 15/60; G11B 15/665
[52] U.S. Cl. ........................... 360/94; 360/85
[58] Field of Search ........................ 360/94, 85

[56] References Cited

U.S. PATENT DOCUMENTS 4,786,996  11/1988  Ohtani et al. .................. 360/94

FOREIGN PATENT DOCUMENTS

| 0212720 | 7/1986 | European Pat. Off. |
| 0223952 | 9/1986 | European Pat. Off. |
| 0196623 | 10/1986 | European Pat. Off. |
| 54-63731 | 10/1979 | Japan . |
| 58-12804 | 7/1983 | Japan . |
| 59-193502 | 11/1984 | Japan . |
| 59-227061 | 12/1984 | Japan . |
| 59-227062 | 12/1984 | Japan . |
| 60-1643 | 1/1985 | Japan . |
| 60-9037 | 1/1985 | Japan . |

Primary Examiner—Robert S. Tupper
Attorney, Agent, or Firm—Birch, Stewart, Kolasch & Birch

[57] ABSTRACT

A magnetic recording and reproducing apparatus which enables selective loading of a plurality of kinds of magnetic tape cassettes of different sizes, including a slider which receives a large magnetic tape cassette horizontally from an insertion position of the large magnetic tape cassette so as to displace the large magnetic tape cassette horizontally and then, lowers the large magnetic tape cassette vertically and an adapter chassis into which a small magnetic tape cassette is fitted so as to be locked thereto. Upon detection of fitting of the small magnetic tape cassette into the adapter chassis, a magnetic tape is drawn from the small magnetic tape cassette by first and second tape drawing arms mounted on the adapter chassis and upon detection of a state in which the magnetic tape has been drawn from the small magnetic tape cassette and the slider has been displaced to a position for performing recording and reproduction, the adapter chassis is loaded onto the slider located at the position for performing recording and reproduction.

2 Claims, 8 Drawing Sheets

MAGNETIC RECORDING AND REPRODUCING APPARATUS WITH SELECTIVE LOADING OF DIFFERENT SIZED MAGNETIC TAPES

BACKGROUND OF THE INVENTION

The present invention generally relates to magnetic recording and reproducing apparatuses employing magnetic tape cassettes and more particularly, to a magnetic recording and reproducing apparatus in which recording and reproduction can be performed on a plurality of kinds of magnetic tape cassettes of different sizes through selective loading of the magnetic tape cassettes.

Generally, a plurality of kinds of magnetic tape cassettes of different sizes are used for magnetic recording and reproducing apparatuses, for example, video tape recorders (hereinbelow, referred to as "VTRs"). Thus, in the case where recording and reproduction are performed on the magnetic tape cassettes of different sizes, VTRs corresponding to the respective magnetic tape cassettes of different sizes are required to be used. Meanwhile, if recording and reproduction on a small magnetic tape cassette is performed by using a VTR for a large magnetic tape cassette, a cassette adapter is employed.

Figure 1:
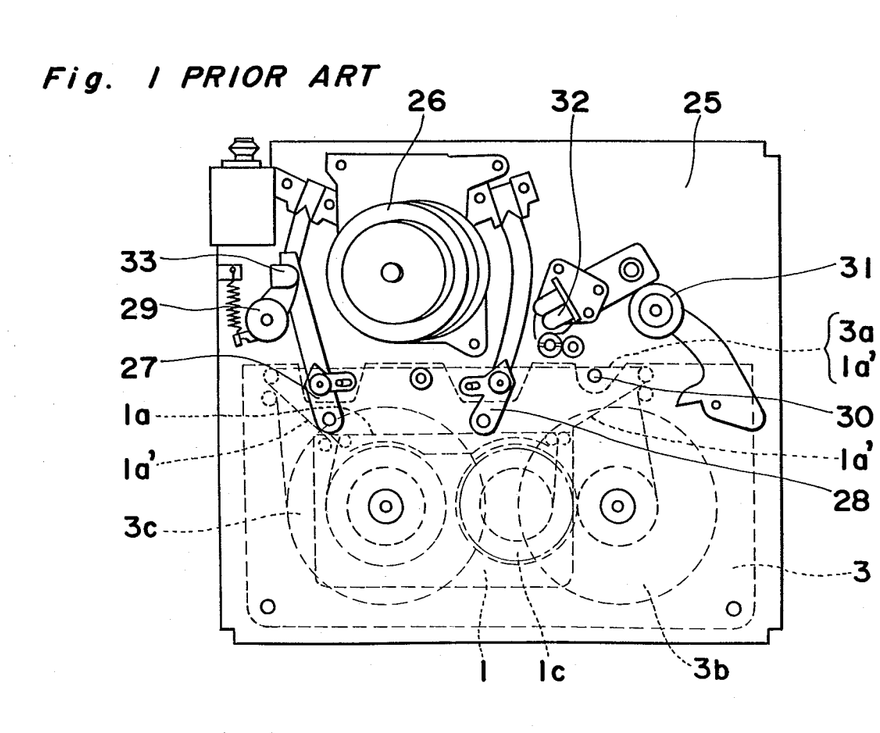
FIG. 1 is a schematic top plan view of a mechanism of a prior art VTR for a large cassette (already referred to)

FIG. 1 shows a mechanism 25 of a known VTR for a large magnetic tape cassette 3. In FIG. 1, reference numeral 1 denotes a small magnetic tape cassette 1. When recording and reproduction on the large cassette 3 are performed in the mechanism 25, the large cassette 3 is loaded into a predetermined position and a magnetic tape 3a is drawn from the large cassette 3 by a first pole base 27 and a second pole base 28 so a to be brought into contact with a drum 26, a guide roller 29, an erasing head 33, an audio head 32, etc. The magnetic tape 3a is pressed against a capstan shaft 30 by a pinch roller 31 and the magnetic tape 3a is fed through rotation of the capstan shaft 30. Then, a reel motor (not shown) is driven so as to rotate reels 3b and 3c such that the magnetic tape 3a is wound around the reels 3b and 3c.

Meanwhile, when the small cassette 1 has been loaded into the mechanism 25 so as to perform recording and reproduction on the small tape cassette 1, the cassette 1 itself is small in size, so that it is impossible to draw a magnetic tape 1a from the small cassette 1 by using the first pole base 27 and the second pole base 28 and thus, recording and reproduction on the small cassette 1 cannot be performed. Furthermore, in order to feed the magnetic tape 1a by the capstan shaft 30, the magnetic tape 1a is required to be drawn substantially to the position of the magnetic tape 3a of the large cassette 3, i.e. a position 1a' when the small cassette 1 is loaded into the mechanism 25. In addition, in order to wind the magnetic tape 1a around a take-up reel 1c, it is necessary to provide a mechanism for transmitting a driving force of the reel motor of the mechanism 25 to the take-up reel 1c.

Figure 2:
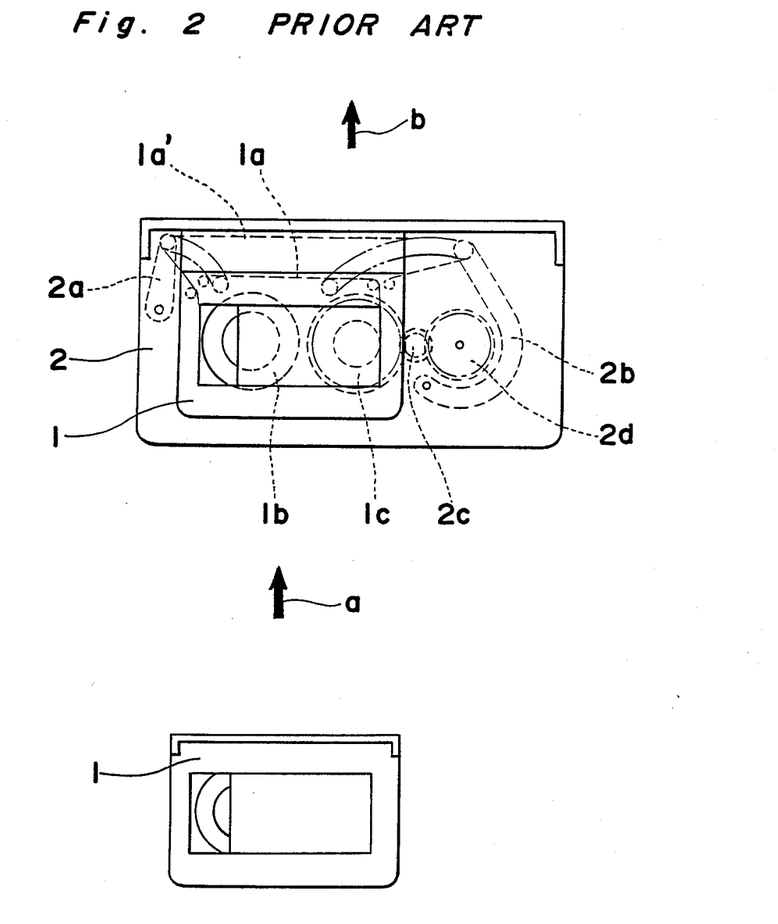
FIG. 2 is a schematic view of a cassette adapter used for the prior art VTR of FIG. 1 (already referred to)

Thus, conventionally, in the case where recording and reproduction on the small cassette 1 are performed by the VTR for the large cassette 3, a cassette adapter 2 is employed as shown in FIG. 2. In FIG. 2, when recording and reproduction on the small cassette 1 are performed by the VTR for the large cassette 3, the small cassette 1 is initially inserted into the cassette adapter 2 in the direction of the arrow a, so that a supply arm 2a and a take-up arm 2b are driven by an adapter motor (not shown) and thus, the magnetic tape 1a engaged with the supply arm 2a and the take-up arm 2b is drawn to the position 1a'. The small cassette 1 has a supply reel 1b and the take-up reel 1c such that the magnetic tape 1a is wound around the supply reel 1b and the take-up reel 1c. The take-up reel 1c is formed, at its hub portion, with a gear in mesh with a driving gear 2c of the cassette adapter 2 and the driving gear 2c is, in turn, engaged with a driving reel 2d. At this time, by inserting the cassette adapter 2 into a cassette control unit (not shown) for the large cassette 3 in the direction of the arrow b, the small cassette 1 is loaded into the VTR and thus, recording and reproduction on the small cassette 1 can be performed. In order to perform winding and rewinding of the magnetic tape 1a, the driving reel 2d and the supply reel 1b are rotated by the reel motor. The small cassette 1 can be removed from the VTR by reversing the preceding steps.

Thus, conventionally, in the case where recording and reproduction on the small cassette are performed by the VTR for the large cassette, it is necessary to use the cassette adapter. Hence, the small cassette is initially inserted into the cassette adapter and the magnetic tape is drawn from the small cassette. Subsequently, the cassette adapter is required to be inserted into the VTR for the large cassette. Furthermore, in the known VTR, such a troublesome operation is required to be performed that the steps of loading are reversed for removing the small cassette.

SUMMARY OF THE INVENTION

Accordingly, an essential object of the present invention is to provide a magnetic recording and reproducing apparatus in which recording and reproduction on a plurality of kinds of magnetic tape cassettes of different sizes can be performed through selective loading of the magnetic tape cassettes without the need for use of a cassette adapter.

In order to accomplish this object of the present invention, a magnetic recording and reproducing apparatus embodying the present invention which enables selective loading of a plurality of kinds of magnetic tape cassettes of different sizes, comprising: a slider which receives a large magnetic tape cassette horizontally from an insertion position of said large magnetic tape cassette so as to displace said large magnetic tape cassette horizontally and then, lowers said large magnetic tape cassette vertically; and an adapter chassis into which a small magnetic tape cassette is fitted so as to be locked thereto; wherein upon detection of fitting of said small magnetic tape cassette into said adapter chassis, a magnetic tape is drawn from said small magnetic tape cassette by first and second tape drawing arms mounted on said adapter chassis; wherein upon detection of a state in which said magnetic tape has been drawn from said small magnetic tape cassette and said slider has been displaced to a position for performing recording and reproduction, said adapter chassis is loaded onto said slider located at the position for performing recording and reproduction.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 3:
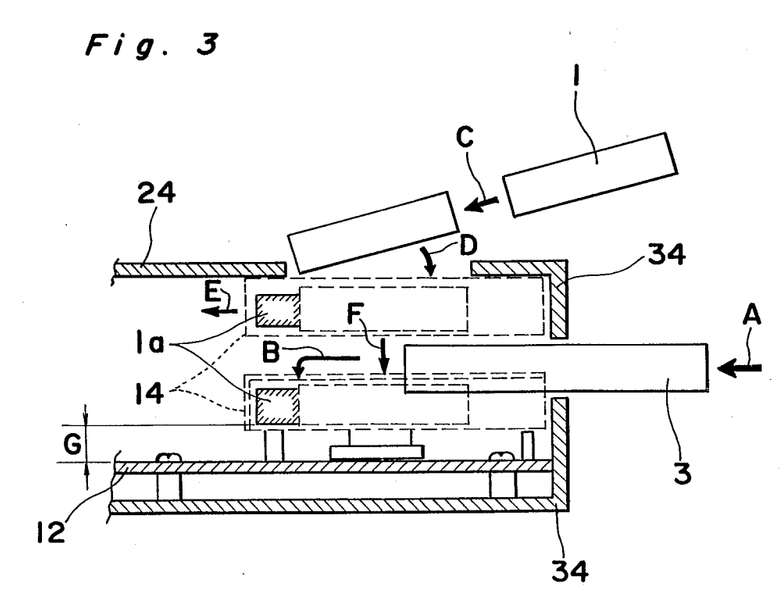
FIG. 3 is a fragmentary schematic sectional view of a magnetic recording and reproducing apparatus of the present invention.
Figure 4:
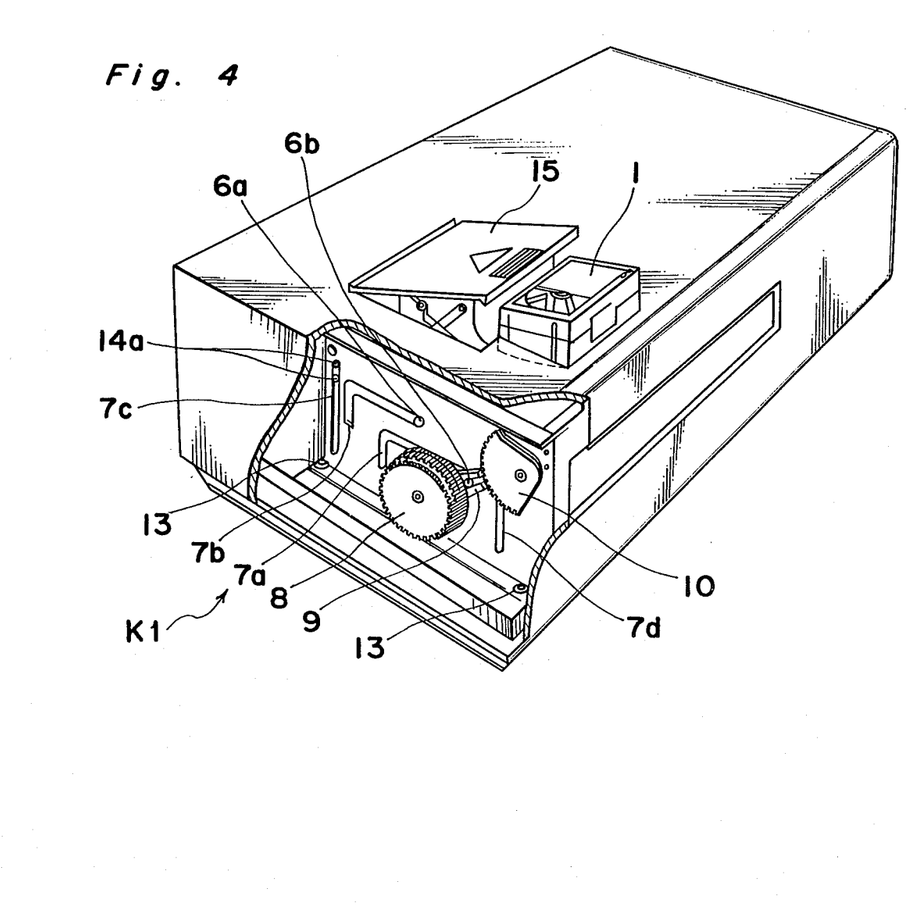
FIG. 4 is a partially cutaway perspective view of a VTR according to a first embodiment of the present invention.

FIG. 3 schematically shows a magnetic recording and reproducing apparatus of the present invention. In FIG. 3, when a large magnetic tape cassette 3 is inserted into the magnetic recording and reproducing apparatus in the direction of the arrow A from a cabinet 34 provided at a front face of the magnetic recording and reproducing apparatus, the large cassette 3 is loaded into a predetermined loading position as shown by the arrow B. In order to perform loading of a small magnetic tape cassette 1, the small cassette 1 is fed in the direction of the arrow C and then, is depressed in the direction of the arrow D so as to be fitted into an adapter chassis 14. Subsequently, a magnetic tape 1a is drawn from the small cassette 1 in the direction of the arrow E by driving an adapter motor (not shown). Then, the adapter chassis 14 is lowered in the direction of the arrow F such that the small cassette 1 is loaded into a predetermined loading position. The small cassette 1 is ejected from the cabinet 34 by reversing the preceding steps. When the small cassette 1 has been loaded into the predetermined loading position, the magnetic tape 1a drawn from the small cassette 1 should be located at a height identical with a height G of a magnetic tape 3a of the large cassette 3 relative to a reference plane of a mechanism of the magnetic recording and reproducing apparatus.

Figure 5:
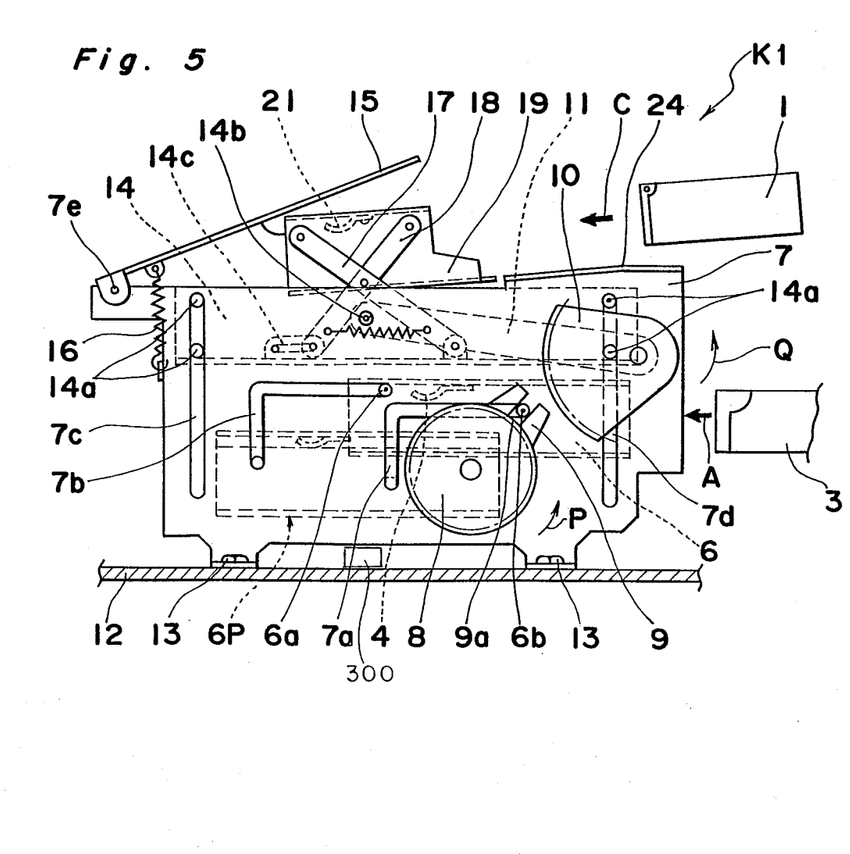
FIG. 5 is a side elevational view of a cassette control unit of the VTR of FIG. 4.
Figure 6:
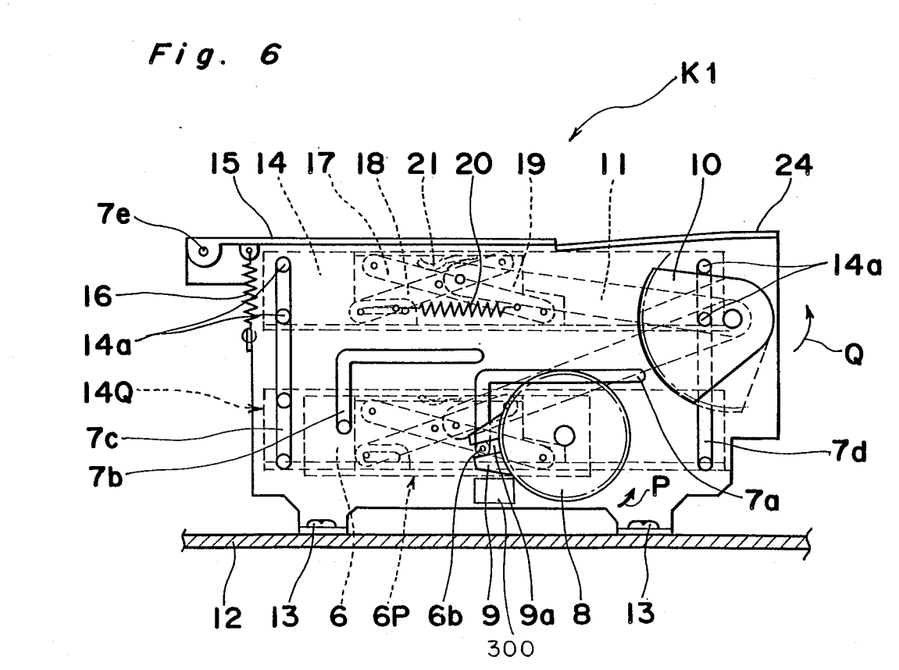
FIG. 6 is a side elevational view of the cassette control unit of FIG. 5 at the time of insertion of a small cassette thereinto.

Hereinbelow, a cassette control unit K1 employed in a VTR according to a first embodiment of the present invention is described with reference to FIGS. 4 to 9. FIGS. 5 and 6 are left side elevational views of the cassette control unit K1 with respect to the direction of insertion of the magnetic tape cassettes. It is to be noted that a right side portion of the cassette control unit K1 is identical, in mechanism, with the left side portion of FIGS. 5 and 6. In FIGS. 5 and 6, a guide plate 7 is formed with two L-shaped grooves 7a and 7b and two rectilinear grooves 7c and 7d. The guide plate 7 is mounted on a main chassis 12 of the VTR by two machine screws 13. A driving gear 8 and a drive arm 9 fixed to each other are coaxially rotatably mounted on the guide plate 7. A loading gear 10 and a loading arm 11 secured to each other are also coaxially rotatably mounted on the guide plate 7.

A first guide rod 6a and a second guide rod 6b stand on a slider 6 so as to be inserted into the L-shaped grooves 7a and 7b, respectively. Furthermore, the second guide rod 6b is inserted into a U-shaped groove 9a of the drive arm 9.

Figure 7:
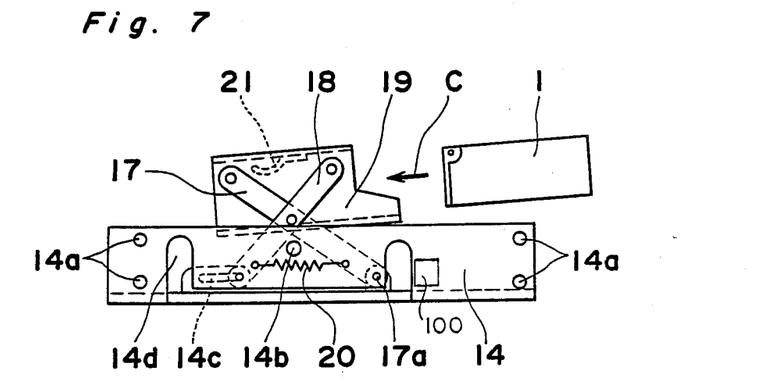
FIG. 7 is a side elevational view of an insertion portion for a small cassette in the cassette control unit of FIG. 5.
Figure 8:
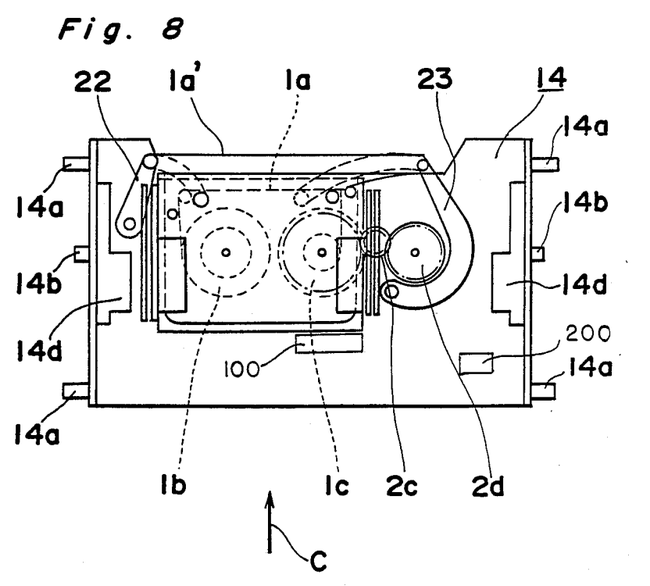
FIG. 8 is a top plan view of the insertion portion of FIG. 7.

As best shown in FIGS. 7 and 8, four guide rods 14a and a loading rod 14b stand on each of opposite side faces of an adapter chassis 14. As shown in FIG. 5, two of the four guide rods 14a are inserted into the rectilinear groove 7c and the remaining two of the four guide rods 14a are inserted into the rectilinear groove 7d. The loading rod 14b is rotatably mounted on the loading arm 11.

Although not specifically shown, the driving gears 8 disposed at the left and right sides of the cassette control unit K1 are provided with a gear for modifying rotary phase of the driving gears 8 so as to be rotated at an identical rotary phase. Likewise, the loading gears 10 disposed at the left and right sides of the cassette control unit K are provided with a gear for modifying rotary phase of the loading gears 10 so as to be rotated at an identical rotary phase. A cassette cover 15 for the small cassette 1 is rotatably mounted on the guide plate 7 so as to be rotated about a support rod 7e and is urged by a tension spring 16 so as to be closed.

FIGS. 7 and 8 schematically show the adapter chassis 14 acting as an insertion portion for the small cassette 1. A first housing arm 17 is rotatably mounted on the adapter chassis 14 so as to be rotated about a rod 17a. An end of a second housing arm 18 is slidably fitted into an elongated opening 14c of the adapter chassis 14. The first housing arm 17 and the second housing arm 18 are rotatably coupled, at their central portions, with each other and are rotatably attached to a housing 19. A tension spring 20 is engaged with the first housing arm 17 and the second housing arm 18 and urges the housing 19 so as to lift the housing 19.

In FIG. 5, when the large cassette 3 is loaded into the VTR, the large cassette 3 is inserted into the slider 6 (FIG. 9) in the direction of the arrow A with a hand, so that the large cassette 3 is pressed downwardly against a bottom plate of the slider 6 by a pair of springs 4 attached to the slider 6 so as to be secured to the slider 6, while a loading start switch (not shown) detects the large cassette 3 so as to drive a drive motor (not shown) such that the driving gear 8 and the drive arm 9 are rotated by the drive motor in the direction of the arrow P. In response to this rotation of the driving gear 8 and the drive arm 9, the second guide rod 6b gripped by the drive arm 9 is driven. Hence, through guide of the first and second guide rods 6a and 6b by the L-shaped grooves 7a and 7b of the guide plate 7, respectively, the slider 6 is initially displaced horizontally and is lowered vertically to a position 6P for performing recording and reproduction and thus, loading of the large cassette 3 into the VTR is completed.

On the other hand, in the case where the large cassette 3 is ejected from the VTR, the above described steps are reversed through reverse rotation of the drive motor and thus, the large cassette 3 is ejected from the VTR.

Figure 9:
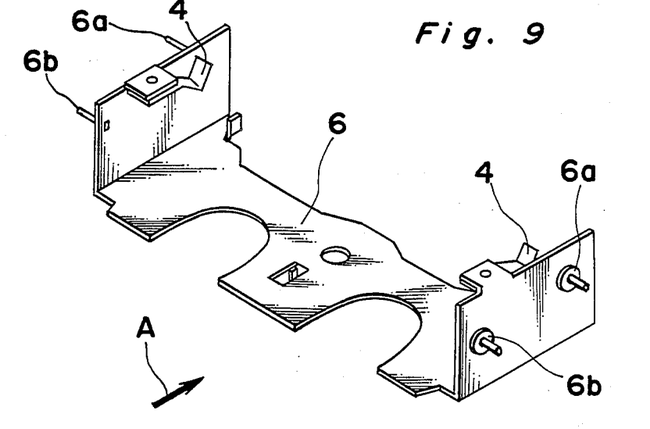
FIG. 9 is a perspective view of an insertion portion for a large cassette in the cassette control unit of FIG. 5.

In FIGS. 5 and 6, in the case where the small cassette 1 is loaded into the VTR, the small cassette 1 is initially inserted, with a hand, into the housing 19 disposed at the position of FIG. 5. Therefore, the small cassette 1 is pressed downwardly against a bottom plate of the housing 19 by a pair of springs 21 attached to the housing 19 in the same manner as the springs 4 of the slider 6 so as to be secured to the housing 19. Then, when the housing 19 is depressed downwardly, the housing 19 is located at the position of FIG. 6 and is locked to the adapter chassis 14 by a lock mechanism (not shown) of the adapter chassis 14. At this time, a cassette detecting switch 100 for detecting insertion of the small cassette 1 and a lock detecting switch (not shown) for detecting locking of the housing 19 detect that the housing 19 having the small cassette 1 inserted thereinto has been locked to the adapter chassis 14. Thus, first and second tape drawing arms 22 and 23 for drawing the magnetic tape 1a from the small cassette 1, each of which has a roller attached rotatably to its distal end and is rotatably mounted on the adapter chassis 14, are driven by a housing motor (not shown) so as to draw the magnetic tape 1a from the small cassette 1 to a predetermined position 1a' as shown in FIG. 8. At the same time, the drive motor is driven in the same manner as in the case of loading of the large cassette 3 into the VTR so as to displace the slider 6 to the position 6P for performing recording and reproduction. Upon detection of a state in which the magnetic tape 1a has been drawn to the predetermined position 1a' by sensor 200 and upon detection by sensor 300 of a state in which the slider 6 has been displaced to the position 6P for performing recording and reproduction, a loading motor (not shown) is driven so as to drive the loading gear 10 and the loading arm 11 in the direction of the arrow Q of FIG. 6. Hence, the adapter chassis 14 in a horizontal state is as a whole lowered to a position 14Q through guide of the guide rods 14a by the two rectilinear grooves 7c and 7d of the guide plate 7 so as to be placed on the slider 6 disposed at the position 6P for performing recording and reproduction. Since the slider 6 is not provided with a top plate as shown in FIG. 9 and the adapter chassis 14 is formed with a pair of openings 14d for preventing the first guide rods 6a, the second guide rods 6b and the springs 4 of the slider 6 from coming into contact with the adapter chassis 14 as shown in FIGS. 7 and 8, the adapter chassis 14 is closely placed on the slider 6 without any clearance therebetween. As shown in FIG. 8, the small cassette 1 has a supply reel 1b and a take-up reel 1c such that the magnetic tape 1a is wound around the supply reel 1b and the take-up reel 1c. The take-up reel 1c is formed, at its hub portion, with a gear in mesh with a driving gear 2c mounted rotatably on the adapter chassis 14 and the driving gear 2c is, in turn, engaged with a driving reel 2d. In order to perform winding and rewinding of the magnetic tape 1a, the driving reel 2d and the supply reel 1b are rotated by a reel motor (not shown).

In order to eject the small cassette 1 from the VTR, the loading motor is rotated reversely so as to lift the adapter chassis 14 in the reverse order of loading. Upon detection of completion of lift of the adapter chassis 14, the drive motor is rotated reversely so as to displace the slider to its original position in the same manner as ejection of the large cassette 3 from the VTR. When the adapter chassis 14 has been lifted, the first and second tape drawing arms 22 and 23 are driven in a direction opposite to the above described one so as to return the magnetic tape 1a to the original position. Locking of the housing 19 by the lock mechanism of the adapter chassis 14 is released by a solenoid (not shown). Therefore, the housing 19 is lifted by action of the tension spring 20, so that the cassette cover 15 for the small cassette 1 is opened and thus, the small cassette 1 can be taken out of the VTR.

Meanwhile, even if the housing 19 is depressed downwardly so as to be locked to the adapter chassis 14 when the small cassette 1 is not inserted into the housing 19, the cassette detecting switch for detecting insertion of the small cassette 1 is not actuated. Thus, the first and second tape drawing arms 22 and 23 are not driven, so that the adapter chassis 14 is not lowered. Therefore, when the small cassette 1 is not used, it becomes possible to close the cassette cover 15 after the housing 19 has been depressed downwardly so as to be locked to the adapter chassis 14. At this time, since the adapter chassis 14 is not lowered, the large cassette 3 can be inserted into the cassette control unit K1.

Figure 10:
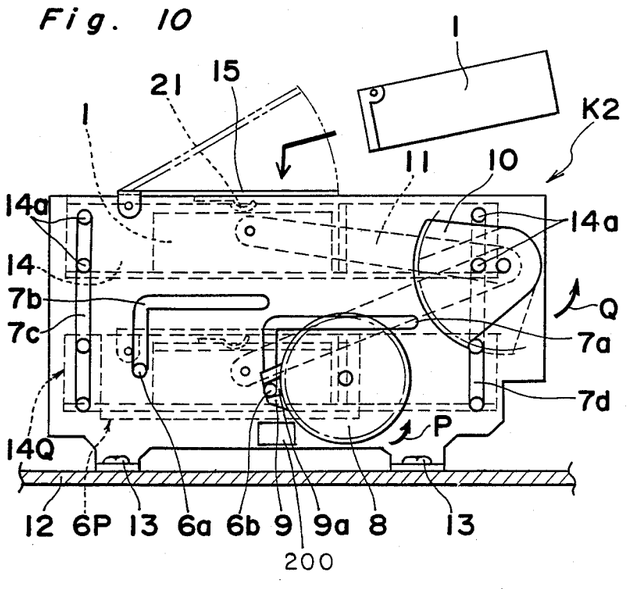
FIG. 10 is a view similar to FIG. 5, particularly showing a second embodiment of the present invention.

FIG. 10 shows a cassette control unit K2 employed in a VTR according to a second embodiment of the present invention. In the cassette control unit K2, the small cassette 1 is directly fitted into the adapter chassis 14 with a hand without using the housing 19. The cassette cover 15 is openably attached to the adapter chassis 14 so as to be locked in its closed state. The springs 21 are attached to the cassette cover 15. In order to fit the small cassette 1 into the adapter chassis 14, the small cassette 1 is directly fitted into the adapter chassis 14 with a hand by opening the cassette cover 15 and then, the cassette cover 15 is closed. The small cassette 1 is depressed downwardly against the bottom plate of the adapter chassis 14 by the springs 21 so as to be secured to the adapter chassis 14. The subsequent operations are the same as those of the cassette control unit K1.

As is clear from the foregoing, in the VTR of the present invention, when recording and reproduction on the large cassette 3 are performed, the large cassette 3 is horizontally received from the insertion position of the large cassette 3 so as to be displaced horizontally and then, is lowered vertically by the slider 6. Meanwhile, when recording and reproduction on the small cassette 1 are performed, the magnetic tape 1a is drawn, upon detection of fitting of the small cassette 1 into the adapter chassis 14, from the small cassette 1 by the first and second tape drawing arms 22 and 23 mounted on the adapter chassis 14. Then, upon detection of the state in which the magnetic tape 1a has been drawn from the small cassette 1 and the slider 6 has been displaced to the position 6P for performing recording and reproduction, the adapter chassis 14 is loaded onto the slider 6 located at the position 6P for performing recording and reproduction.

Accordingly, in accordance with the present invention, a plurality of the cassettes of different sizes can be selectively used in a single VTR without employing the cassette adapter. Thus, for example, in a VTR for a large cassette, recording and reproduction on a small cassette can be performed easily without the need for using the cassette adapter.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A magnetic recording and reproducing apparatus which enables selective loading of a plurality of kinds of magnetic tape cassettes of different sizes, comprising:
    a slider which receives a large magnetic tape cassette horizontally from an insertion position of said large magnetic tape cassette;
    means for displacing said slider horizontally and then, lowering said slider vertically;
    an adapter chassis into which a small magnetic tape cassette is fitted so as to be locked thereto;
    control means for detecting fitting of said small magnetic tape cassette into said adapter chassis;
    means for drawing a magnetic tape from said small magnetic cassette, said means for drawing including first and second tape drawing arms mounted on said adapter chassis;
    said control means also detecting when said magnetic tape has been drawn from said small magnetic tape cassette and said slider has been displaced to a position for performing recording and reproduction; and
    means for loading said adapter chassis onto said slider located at the position for performing recording and reproduction.

2. The magnetic recording and reproduction apparatus as claimed in claim 1, further comprising:
    a housing for receiving said small magnetic tape cassette thereinto, said housing being retractably mounted on said adapter chassis by said means for loading.

* * * * *